United States Patent [19]

Fitzpatrick

[11] Patent Number: 5,048,680
[45] Date of Patent: Sep. 17, 1991

[54] COMPACT DISC CASE DISPLAY HOLDER AND ASSEMBLY

[76] Inventor: Damian J. Fitzpatrick, 3414 Montrose Dr., Little Rock, Ark. 72212

[21] Appl. No.: 589,014

[22] Filed: Sep. 27, 1990

[51] Int. Cl.⁵ .............................................. B65D 85/57
[52] U.S. Cl. ..................................... 206/309; 206/804
[58] Field of Search ............... 206/307, 309, 310–313, 206/444, 454, 456, 804, 815; 211/40, 41

[56] References Cited

U.S. PATENT DOCUMENTS

| D. 307,513 | 5/1990 | Ozeki | 206/444 |
|---|---|---|---|
| 4,207,979 | 6/1980 | Brown | 206/804 |
| 4,691,826 | 9/1987 | Ozeki | 206/444 |
| 4,714,157 | 12/1987 | Morrone | 206/804 |
| 4,724,956 | 2/1988 | Ozeki | 206/307 |
| 4,823,950 | 4/1989 | Roze | 206/444 |
| 4,892,189 | 1/1990 | Kunimune | 206/311 |
| 4,928,828 | 5/1990 | Cohen | 206/311 |

FOREIGN PATENT DOCUMENTS

| 2620258 | 3/1989 | France | 206/444 |
|---|---|---|---|
| 8907318 | 8/1989 | PCT Int'l Appl. | 206/444 |

Primary Examiner—Jimmy G. Foster
Attorney, Agent, or Firm—Shlesinger, Arkwright & Garvey

[57] ABSTRACT

A compact disc case display holder comprising individual frame means having top, bottom and side portions with two parallel support rods positioned vertically and extending between the top and bottom frame portions. The support rods are spaced a sufficient distance from each other so as to provide not only support for a CD case positioned within the frame but also to allow pivotal movement of the CD case out of the holder when the CD case is urged about the support rod. Additional means are disclosed for interconnecting a number of individual display holder frames to provide an assembly of holders suitable for wall mounted display.

18 Claims, 3 Drawing Sheets

COMPACT DISC CASE DISPLAY HOLDER AND ASSEMBLY

FIELD OF THE INVENTION

The present invention relates to a display and storage device for compact disc cases.

BACKGROUND OF THE INVENTION

With the advent of compact disc technology in the sound recording industry, consumers have been provided with yet another form of audio reproduction which is increasingly supplanting conventional stereophonic phonograph records and cassette tapes. The increase in popularity of the compact disc has in turn created a display and storage problem for both the retail operator and the consumer.

More particularly, a consumer may own a large number of compact discs which creates problems of storage as well as retrieval once the disc has been stored.

Because of the unique size of the compact disc case, a user will very often resort to stacking the individual compact disc cases or merely placing them on edge inside of a suitable box or container. This type of storage becomes inconvenient when the user attempts to select a particular compact disc. If the discs are laid side by side on edge, the user must read the fine print indicated upon the edge of the compact disc case. Alternatively, if the compact disc cases are merely stacked one on top of the other, he must manually flip through the entire pile until he identifies the correct case. Both methods are either tedious or inconvenient. Further, loosely stacking the compact disc cases can lead to damage as well as loss of the compact disc.

A compact disc case serves not only to store and protect the compact disc contained therein, but also to display an artistic jacket design particular to the musician or group associated with the recording. The photography and/or graphic design associated with a compact disc case is very often a visually and aesthetically pleasing characteristic of the product. Not only is this artwork visually attractive, but it also serves to identify the compact disc contained therein. Thus, merely stacking the compact disc cases or placing them on end in a container diminishes the aesthetic value of the compact disc case itself. In addition, a retail outlet will benefit with enhanced sales when the jacket design of the compact disc case is attractively displayed.

The prior art contains a number of attempts to resolve these storage and display problems inherent with compact disc cases. U.S. Pat. No. 4,940,147 (Hunt) discloses a compact disc wall rack which displays a number of compact disc cases in a side by side relationship. The cases are secured into the wall rack with velcro loop pile fasteners. U.S. Pat. No. 4,919,287 (Haskett) discloses a compact disc display unit including a series of individual frame members, each of which is adapted to receive a compact disc case. The compact disc cases are retained within the individual frame members by a retention means including a flange projecting from the bottom of each frame. U.S. Pat. No. 4,102,458 (Fors) discloses a display rack which includes a series of rectangular frame members each of which is provided with a support bar extending the length of the frame and situated across the central opening of the frame. A product situated within the frame will pivot against the bar and out of the frame when urged by a user. East German Patent No. DL 0201381 discloses frame members for supporting records including centrally disposed vertical support bar positioned within the frame. The bars function to support a record positioned in the display stand. Additional display apparatus for records, discs and similar objects include U.S. Pat. Nos. 3,337,059 (Hoy), 4,290,530 (Wooster), 4,691,826 (Ozeki) and 3,752,545 (Schweizer).

OBJECTS AND SUMMARY OF THE INVENTION

Accordingly, it is an object of the present invention to provide a display holder for a compact disc storage case which will readily receive the case and release it with minimum effort on the part of the user.

Another object of the present invention is to provide a compact disc case display holder which will support a single compact disc case and is capable interconnecting with additional display holders to create a mosaic of assorted compact disc cases.

Yet another object of the present invention is to provide a display unit which can be mounted upon a wall for a visual and decorative effect.

Still another object of the present invention is to provide a compact disc case display holder which is economical to manufacture.

A still further object of the present invention is to provide a compact disc case wall rack which is simple in both assembly and disassembly, as well as in use.

An additional object of the present invention is to provide a display holder for compact disc cases which allows quick identification and selection of a particular compact disc.

Yet another object is to provide a compact disc case display holder which will protect the stored cases from misuse and damage.

These and other objects are achieved by providing an apparatus comprising frame means having top, bottom and side portions with two parallel support rods positioned vertically and extending from the top to the bottom portion. The support rods are spaced a sufficient distance from one another so as to provide not only support for a CD case positioned within the frame but also to allow pivotal movement of the CD case out of the holder when the CD case is urged about the support rod. Additional means are disclosed for interconnecting a number of individual display holder frames to provide an assembly of holders suitable for wall mounted display.

Additional objects, advantages and features of the present invention will become apparent from a consideration of the following specification taken in the conjunction with the accompanying drawings.

DESCRIPTION OF THE PREFERRED EMBODIMENTS

FIGURES 1 THROUGH 4

Figure 1:
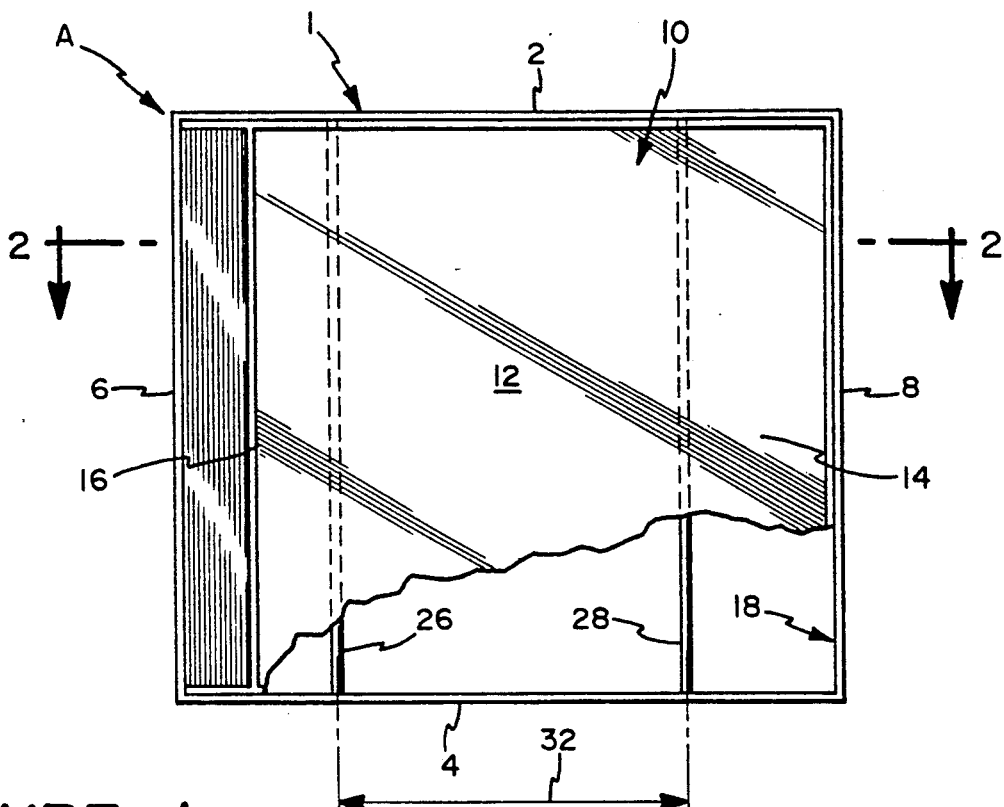
FIG. 1 is a front elevational view of the display holder showing a compact disc case inserted within the frame with the support means shown in phantom lines and with a portion of the compact disc case broken away to expose the support means positioned behind the case and within the frame.

Referring to FIG. 1, a compact disc (CD) case display holder A is shown and includes a frame 1 having a top 2 bottom 4 left side 6 and right side 8. Positioned within the frame 1 is a standard size CD case 10 which interfits within the frame. The tolerances between the exterior perimeter of the CD case 10 and the interior perimeter of the frame 1 are such that the CD case 10 will fit snugly within the frame 1 yet can be removed with minimal effort. Generally, the top 2 and bottom 4 portions have a length between 5 ⅜ to about 5 ⅜ inches. The left side 6 and right side 8 have a length of 4 15/16 of an inch.

Figure 2:
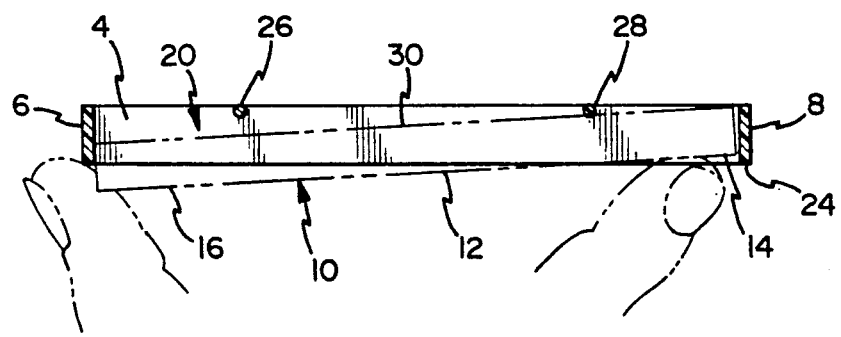
FIG. 2 is a cross-sectional view of FIG. 1 taken along lines 2—2 and viewed in the direction of the arrows and showing in phantom lines a user urging the compact disc case out of the display holder.

The CD case 10 has a top surface 12 and side surfaces 14 and 16 respectively. The interior surface of the frame 1 is defined by a perimeter molding 18 which extends along the interior surface of the top 2, bottom 4, left-side 6 and right side 8. As shown in FIG. 2, the perimeter molding 18 is divided into a first compact disc receiving area 20 and a compact disc support positioning area 22. The receiving area 20 extends within the perimeter molding 18 to a depth sufficient to allow the compact disc case top surface 12 to lie flush with or below the plane of the outer edge 24 of the frame 3. Generally, the receiving area 20 has a depth of one half inch.

As shown in FIGS. 1 and 2, situated within the CD support positioning area 22 are support means 26 and 28. The supports 26, 28 are rigid strips or bars extending between and secured to the interior surface of the top portion 2 and bottom portion 4 of the frame 1. The support means 26, 28 may be constructed of any rigid material however the present invention contemplates the use of plastic for both ease of manufacture and compatibility with the plastic frame 1 structure. The support means 26 and 28 function as back supports for the rear surface 30 of the CD case 10. The support means 26 and 28 are positioned within the frame 1 a critical distance apart as indicated by compact disc support positioning distance 32. Generally, the compact disc support positioning distance 32 has a length no greater than about three inches and no less than about one inch.

Construction materials for the frame members 1 and support means 26 and 28 include the full range of thermoplastic materials available in the art, but may include any material which is easily molded, cut, shaped and assembled. The basic requirement of the material is that it is rigid enough to provide adequate support and stiffness to the display holder.

The parameters of the CD support positioning distance 32 becomes critical during removal of a CD case 10 from the CD display holder A. As best shown in FIG. 2, the positioning of the support mean 26 and 28 within the CD support positioning distance 32 allows the support means 26, 28 to function as a pivot point for the removal of the CD case 10. When the user applies pressure to the CD case side surface 14 of the CD case top surface 12, the support means 28 will act as a fulcrum and cause pivoting of the compact disc case 10 at side surface 16 and out of and beyond the left side 6 of the frame 3. As can be appreciated, a pivot on the opposite side will occur if the user applies pressure to side surface 16 of CD case top surface 12 (not shown).

Figure 3:
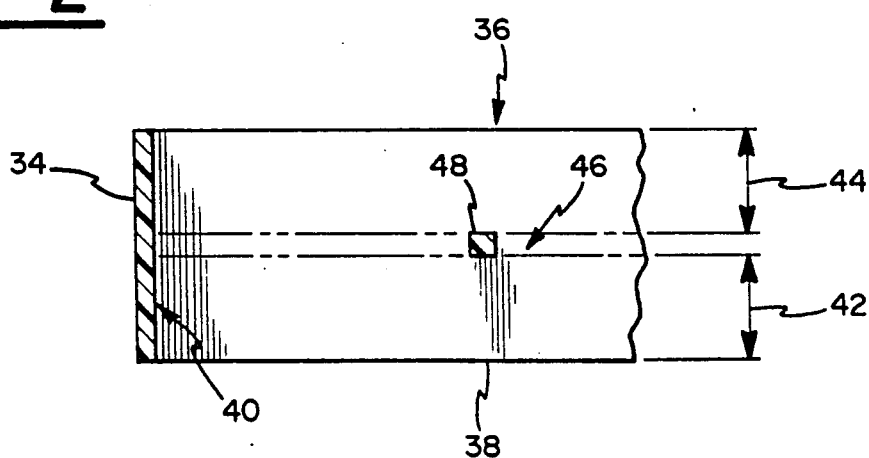
FIG. 3 is an enlarged fragmentary cross sectional view of another embodiment of the present invention illustrating a fragmentary view of the horizontal cross-sectional view shown in the embodiment of FIG. 2.

As best shown in FIG. 3, a second embodiment of the present invention depicts a portion of frame 36 including left side portion 34 and bottom portion 38. The interior of the frame 36 includes a perimeter molding 40 extending along the inside of bottom 38, left side 34, right side and top (not shown). The frame 36 includes a first CD receiving area 42, as indicated by the vertical arrow. The first CD receiving area 42 has a depth of about one half inch. A CD support positioning area 46 is also situated within the perimeter molding 40 and includes support means 48. A second CD receiving area 44 is also located within the perimeter molding 40 and is situated opposite the first CD receiving area 42 with the CD support positioning area 46 extending therebetween. The second CD receiving area 44 also has a depth of about one half inch. This disclosed embodiment effectively doubles the total CD receiving area thereby allowing twice as many compact disc cases 10 to be inserted within a single frame 36. The compact disc cases 10 are arranged in a back to back relationship having the support means 48 positioned therebetween (not shown). Positioning of the support means 48 is restricted to the same parameters as that described within the CD support positioning distance 32 given in FIGS. 1 and 2.

Figure 4:
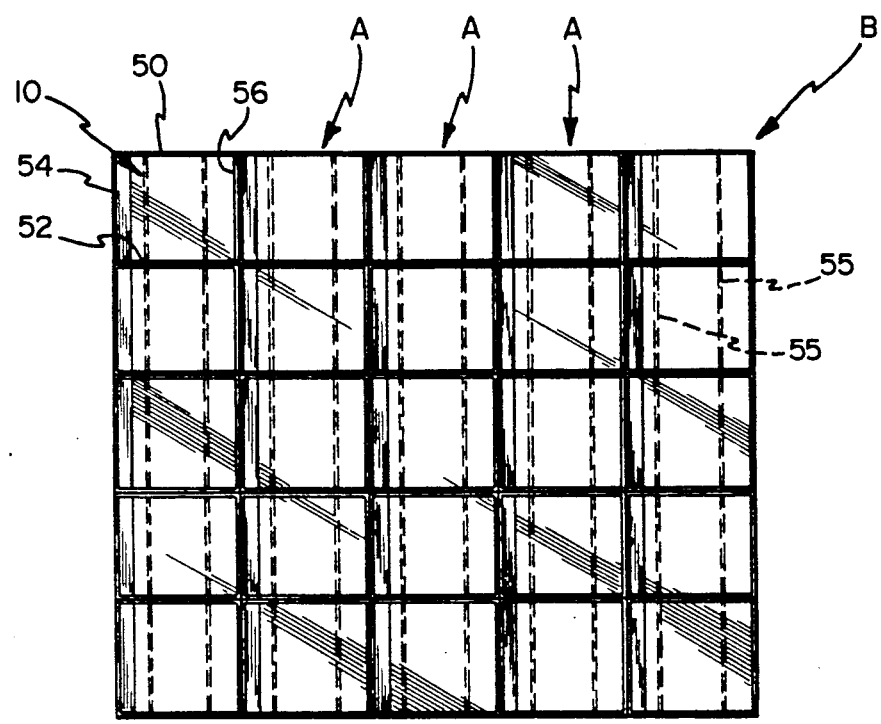
FIG. 4 is a front elevational view illustrating a series of interconnected display holder frames containing compact disc cases and with the support means shown in phantom lines.

Turning now to FIG. 4, a series of interconnected, individual CD case display holders A are arranged to provide an assembly B suitable for wall mounting. As depicted in FIG. 1 and now shown in FIG. 4, each of the individual CD case display holders A include a top 50, bottom 52, left side 54 and right side 56 forming a frame into which a CD case 10 is inserted. Support means 55 are shown in phantom lines. An individual CD case display holder A is secured to a second CD case holder A along the exterior surface of the frame top 2, bottom 4, left side 6 or right side 8. Any of the wide variety of securing means known in the art is contemplated within the scope of the present invention. This includes but is in no way limited to clips, snap fasteners, velcro and adhesives. The primary requirement of the securing means is that it maintain the integrity of the assembly as individual holders A are added to the assembly. As can be appreciated, a user has a great deal of latitude in creating the desired geometric arrangement of interconnected CD case display holders A. Further, additions to the interconnected assembly B can be added as the user's CD collection increases.

FIGS. 5 THROUGH 6

Figure 5:
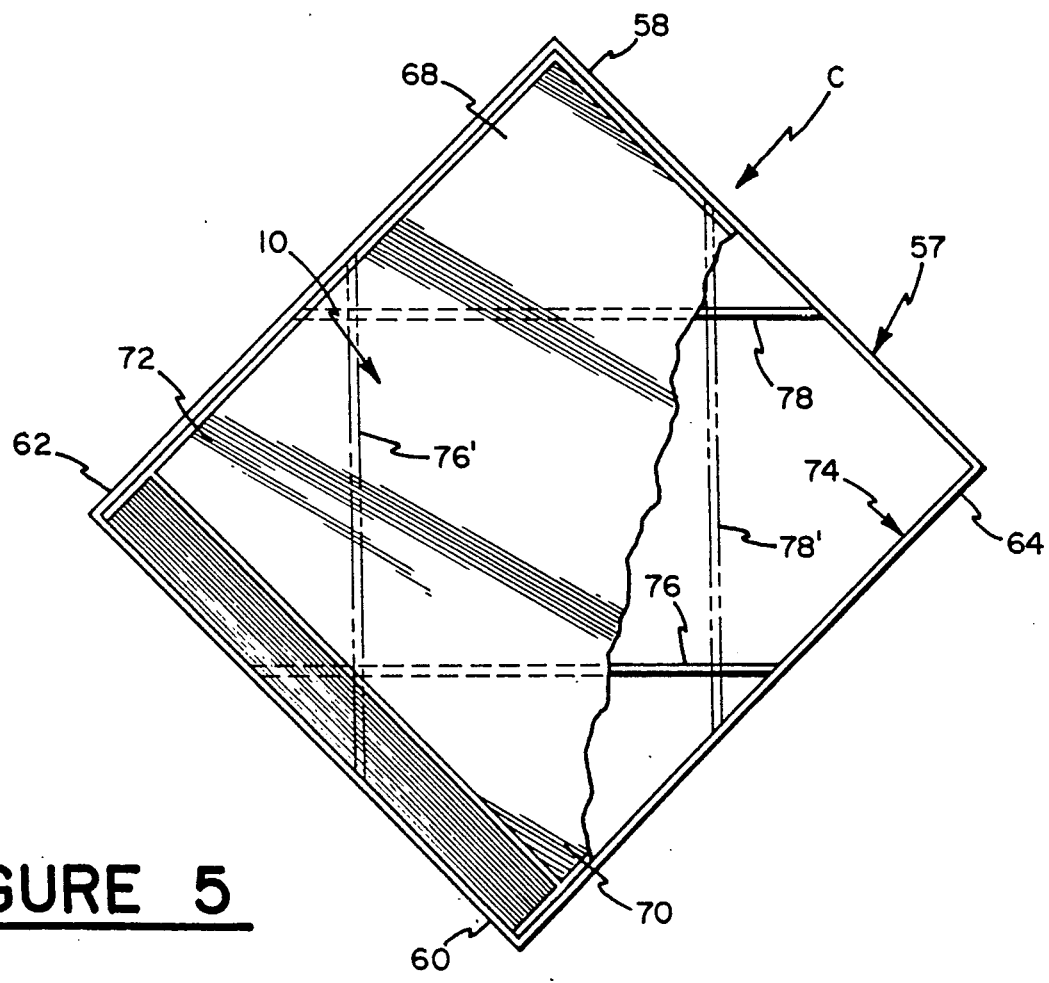
FIG. 5 is a front elevational view of an alternative embodiment of the display holder frame with a compact disc case positioned within the frame and having a portion of the compact disc case broken away to expose the support means positioned behind the case and within the frame.

Referring to FIG. 5, an alternative embodiment is illustrated. This alternative embodiment discloses a CD case display holder C including a frame 57 defined by a top 58, bottom 60, left side 62 and right side 64. A CD case 10 is shown inserted within the frame members and includes a top surface 68, bottom surface 70 and side surfaces 72 (only one of said side surface is shown). The CD case display holder C includes a perimeter molding 74 extending along the interior surface of the frame 57 and is defined by the top 58, bottom 60, left side 62 and right side 64. The perimeter molding 74 of CD case display holder C includes a CD receiving area and a CD support positioning area with critical distance (not shown). Support means 76 and 78 are positioned within the CD support positioning area and serve as a support for the back of a CD case 10 when positioned within the display holders C.

The dimension of the CD case display holder C is identical to that given in FIGS. 1 and 2. Additionally, the CD support positioning distance is also the same as that given for FIGS. 1 and 2. The width of the CD support positioning area does not extend more than about one half of the width of the frame 57 and not less than about one seventh of the width of the frame 57.

In use, a user may place a CD case 66 within the CD case display holders C so that the support means 76 and 78 rest against the back of the CD case 10. To remove the CD case 10 from the display holders C, a user would preferably apply pressure at either the CD case top surface 68 or CD case bottom surface 70, allowing respective support means 76, 78 to function as a fulcrum and cause horizontal pivoting of the opposite end of the CD case 66 out of the holder frame 57. Applying pressure at the top surface 68 is more likely to cause the CD to fall to the floor unless the other hand is there to catch it. Alternatively, the support means 76' and 78' are shown in the vertical to permit vertical pivoting of either side of the CD case 10 thereby avoiding dropping of the CD case 10 to the floor.

Figure 6:
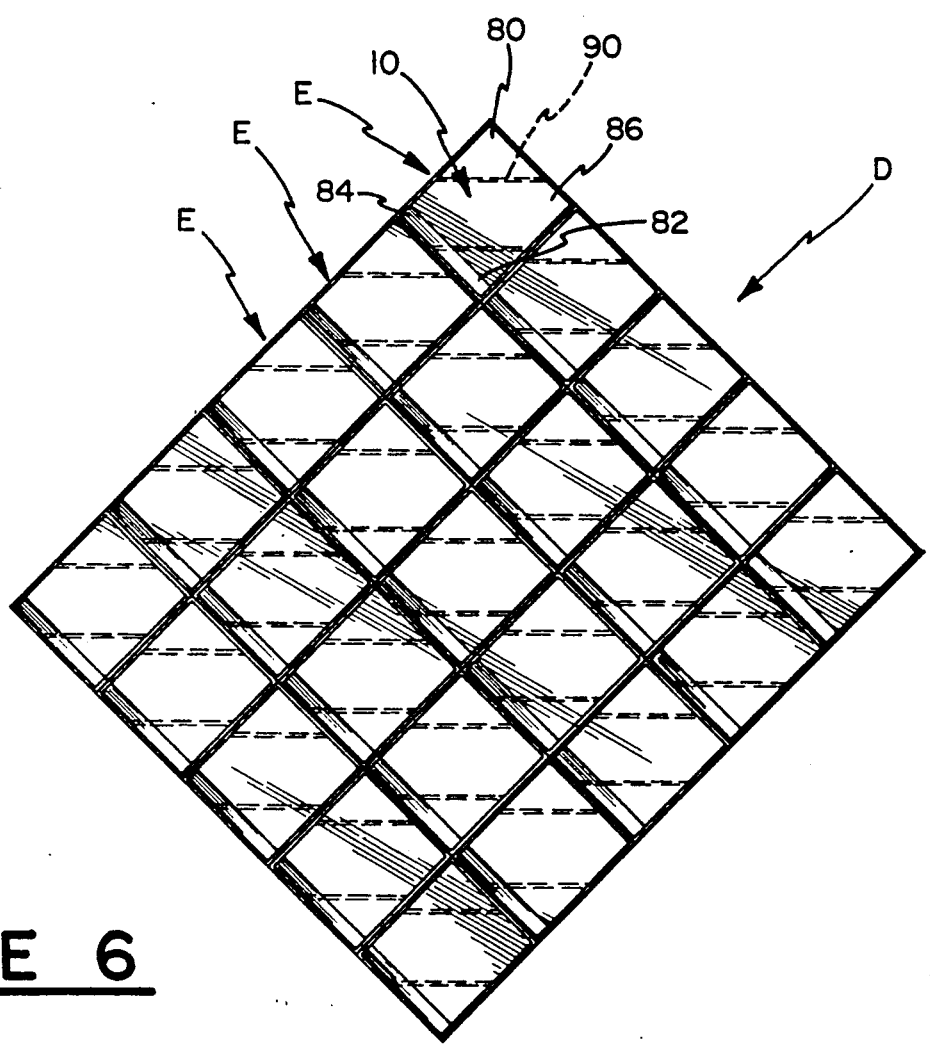
FIG. 6 is a front elevational view of an alternative embodiment showing a series interconnected individual display holder frames with the support mean shown in phantom lines.

FIG. 6 illustrates an embodiment whereby a number of individual CD case display holders C are interconnected to form a CD case display assembly D suitable for wall mounting. A number of individual CD case display holders E are shown, each of which includes a top 80, bottom 82, left side 84 and right side 86. A CD case 88 is inserted in each individual CD case display holder E. Support means 90 are shown in phantom lines. The individual CD case display holders E are secured as mentioned above to one another along the exterior surfaces of the frame top 80, bottom 82, left side 84 and right side 86 portions.

While this invention has been described as having preferred design, it is understood that it is capable of further modification, uses and/or adaptations of the invention following in general the principles of the invention and including such departures from the present disclosure as come within known or customary practice in the art to which the invention pertains, and as may be applied to the essential features set forth, and fall within the scope of the invention or the limits of the appended claims.

What I claim is:

1. A display holder for a compact disc case having a top surface and sides comprising:
   a) frame means having top, bottom and side portions;
   b) said frame portions forming a perimeter molding having top and bottom edges;
   c) said molding having a first interior compact disc receiving area and a second interior compact disc support positioning area.
   d) compact disc support means only in said second interior compact disc support positioning area;
   e) said compact disc support means being comprised by rod-like members extending from one of said portions to said portion opposite thereto;
   f) said compact disc support means being centrally positioned between said side portions and spaced therefrom;
   g) said compact disc support positioning area being of a width not more than about one half of the width of said frame means and not less than about one seventh of the width of said frame means;
   h) said molding conforming to a compact disc case and having an interior perimeter surface generally conforming to a compact disc case perimeter;
   i) said molding interior perimeter providing a very slight clearance between said molding interior perimeter and the perimeter of the compact disc case when positioned in said holder;
   j) whereby when a compact disc case is positioned in said holder and pressure is applied to said top surface of said compact disc case on one of said sides thereof, said compact disc support means will act as fulcrum and cause pivoting of said compact disc case in said holder to raise one side thereof to permit manual extraction of said compact disc case from said holder.

2. A compact disc case display holder as recited in claim 1 and wherein:
   a) said first interior compact disc receiving area has a depth equal to the depth of the compact disc case so as to position the compact disc case in the display holder flush with said frame portion top edge 3. A compact disc case display holder as recited in claim 2 and wherein:
   a) said first interior compact disc receiving area has a depth of about one half inch.

4. A compact disc case display holder as recited in claim 1 and wherein
   a) said compact disc support positioning area has a width no greater than about three inches and no less than about one inch.

5. A compact disc case display holder as recited in claim 1 and wherein:
   a) said rod-like members are parallel and transparent.

6. An assembly of compact disc case display holders as recited in claim 1 and further including:
   a) means for securing said display holders to each other to form a predetermined assembly.

7. An assembly as recited in claim 6 and wherein:
   a) said securing means is a clip.

8. An assembly as recited in claim 6 and wherein:
   a) said securing means is an adhesive.

9. An assembly as recited in claim 6 and wherein:
   a) said securing means is a snap fastener.

10. A compact disc case display holder as recited in claim 1 and wherein:
    a) said top and bottom portions have a width no greater than about five and six eights inches and no less than about five and five eights inches and;
    b) said side portions have a height no greater than about four and fifteen sixteenth inches.

11. A compact disc case display holder as recited in claim 1 and wherein:
    a) said molding has a second interior compact disc case receiving area and said first and said second compact disc case receiving areas are positioned on opposite sides of said second interior compact disc support positioned area.

12. A compact disc case display holder as recited in claim 11 and wherein:
   a) said second interior compact disc case receiving area has a depth of about one half inch.

13. A compact disc case display holder as recited in claim 1 and wherein:
   a) said frame means is constructed from plastic materials.

14. A compact disc display holder as recited in claim 1 and wherein:
   a) said compact disc support positioning area extending vertically from said top portion to said bottom portion.

15. A compact disc display holder as recited in claim 1 and wherein:
   a) said compact disc support positioning area extending horizontally from one of said side portions to said side portion opposite thereto.

16. An assembly of display holders for a compact disc case having a top surface and sides comprising:
   a) frame means having top, bottom and side portions;
   b) said frame portions forming a perimeter molding having top and bottom edges;
   c) said molding having a first interior compact disc receiving area and a second interior compact disc support positioning area;
   d) compact disc support means only in said second interior compact disc support positioning areas;
   e) said compact disc support positioning area extending from one of said positions to said portions opposite thereto;
   f) said compact disc support means being centrally positioned between said side portions and spaced therefrom;
   g) said compact disc support positioned area being of a width not more than about one half of the width of said frame means and not less than about one seventh of the width of said frame means;
   h) said molding conforming to a compact disc case and having an interior perimeter surface generally conforming to a compact disc case perimeter;
   i) said molding interior perimeter providing a very slight clearance between said molding interior perimeter and the perimeter of the compact disc case when positioned in said holder;
   j) adhesive securing means for securing said frame means of said display holders to each other to form a predetermined assembly;
   k) whereby when a compact disc case is positioned in said holder and pressure is applied to said top surface of said compact disc case on one of said sides thereof said compact disc support means will act as a fulcrum and cause pivoting of said compact disc case in said holder to raise one side thereof to permit manual extraction of said compact disc case from said holder.

17. A display holder for a compact disc case having a top surface and sides comprising:
   a) frame means having a front and rear, top, bottom and side portions forming an open perimeter molding from said front to said rear;
   b) said open perimeter molding having a first interior compact disc receiving area and a second interior compact disc support positioning area;
   c) compact disc support means only in said second interior compact disc support positioning area;
   d) said compact disc support means being comprised by only one pair of rod-like members extending from one of said portions to said portion opposite thereto in said open perimeter molding;
   e) said rod-like members being centrally positioned between said side portions and spaced therefrom;
   f) said compact disc support positioning area being of a width not more than about one half of the width of said frame means and not less than about one seventh of the width of said frame means;
   g) said open perimeter molding conforming to a compact disc case and having an interior perimeter surface generally conforming to a compact disc case perimeter;
   h) said open perimeter molding providing a very slight clearance between said first interior area and the perimeter of the compact disc case when positioned in said holder;
   i) means for securing said display holders to each other to form a predetermined assembly;
   j) whereby when a compact disc case is positioned in said holder and pressure is applied to said top surface at said compact disc case on one of said sides thereof, only one rod-like member of said pair of rod-like members will act as a fulcrum and cause pivoting of said compact disc case in said holder to raise one side thereof to permit manual extraction of said compact disc case from said holder.

18. An assembly of compact disc case display holders as recited in claim 17, and wherein:
   a) said means for securing said display holders to each other to form a predetermined assembly selected from the group consisting of adhesive, clips, snap fasteners and velcro.

* * * * *